Patented Jan. 8, 1935                                              1,987,106

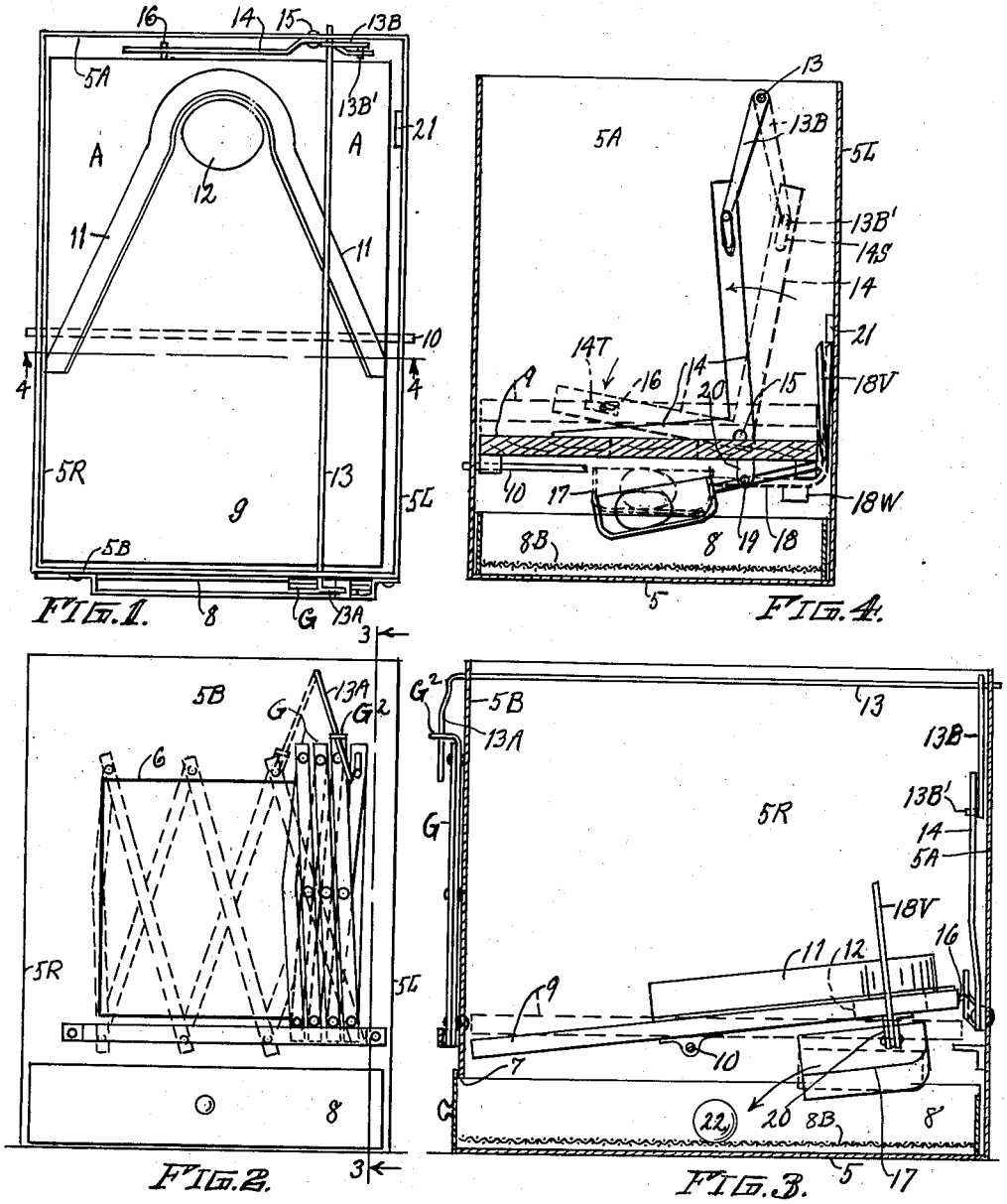

UNITED STATES PATENT OFFICE 1,987,106

TRAP NEST

Carl S. Hedquist, Minneapolis, Minn.

Application April 28, 1932, Serial No. 607,991

3 Claims. (Cl. 119—47)

My invention relates to nests in general and more particularly to a nest for the poultry industry.

The main object is to provide a simple highly efficient and inexpensive nest, the use of which contributes to efficiency in the poultry business. Eggs are stored out of reach of the hen, are readily removed without disturbing a hen lying in the nest. Eggs are available in the cleanest possible condition. Among the advantages of this device, particularly when used in batteries, non-laying hens are quickly discovered and may be segregated. Other objects and advantages are hereinafter fully set forth, reference being had to the accompanying drawing, in which,—

Fig. 1 is a top view and Fig. 2 a front elevation of my device in a preferred form.

Fig. 3 is a longitudinal sectional elevation in a plane close to one side of the device as on line 3—3 in Fig. 2.

Fig. 4 is a cross sectional view about as on line 4—4 in Fig. 1, certain minor details comprising mainly a guard 11 being omitted.

Referring to the drawing by reference numerals, I have illustrated my device in a single unit, it being understood that when set up a large number of the devices may be used in vertical tiers and horizontal rows according to requirements, each unit as the one illustrated being for one laying hen at a time. One unit as shown is hereinafter designated a nest.

The nest comprises preferably an upwardly open box like structure with a bottom 5, side walls 5R and 5L, rear wall 5A and front wall 5B, the latter provided with an opening 6 (see Fig. 2) large enough for a hen to pass through freely. Below the opening 6 is provided, at the base and in the front wall, another opening 7, through which a tray 8 is slidable into the lower part of the nest, the tray adapted to slide inwardly on the base 5. The bottom of said tray, designated 8B is slightly elevated and is of any suitable foraminous material such as wire screen.

In this device a hen enters the box at 6 stepping onto a pivotally mounted platform 9 mounted on a transverse shaft 10, said shaft journaled in the side walls and located preferably about centrally or slightly forward of center. The platform is normally retained partly by frictional resistance in the gate to extending it, in the slightly inclined position shown in Fig. 3, its rear edge highest. 11 is an approximately V-shaped upright guard on the rear half of the platform, its closed end being rearmost and partially encircling an outlet, or aperture 12, said aperture so located that when a hen is laying an egg the latter will drop through said aperture onto a receiver member presently to be described. It will be understood that the platform is preferably covered with straw particularly in the spaces A outwardly of the guard 11 (Fig. 1), care being taken to leave an opening therein over the aperture 12. As a hen enters the nest and its weight bears on the rear part of the platform 9 the latter moves downwardly to approximately a position in horizontal plane (shown dotted in Fig. 3) and is retained in said position until an egg has been laid. The hen is kept in the trap-nest by an automatic device actuated by the above described movement of platform 9. Said device comprises a collapsible gate G, of the lazy-tong principle of construction, the gate when collapsed, occupying a position to one side of entrance 6, and when spread out covers the said opening as shown by dotted lines in Fig. 2. The gate is opened and shut automatically by a rock shaft 13 journaled in the front and rear walls and its forward end comprising a downwardly directed arm 13A slidably engaging an ear G2 of the gate G.

13B is another arm on shaft 13 near the rear wall and having at its lower free end a horizontal finger 13B' slidably engaging in an elongated slot 14S in the upright arm of a bell crank lever 14 pivoted on a pin 15 fixed in the rear wall 5A. The other arm of said bell crank extends laterally of and between the rear wall 5A and the adjacent rear edge of the platform 9 and has a slot 14T engaged by a fixed pin 16 protruding from the rear edge of the platform. Obviously when the platform is pressed down, rearward of shaft 10 the bell-crank 14 is oscillated and it in turn oscillates crank arm 13B and shaft 13 and the forward arm 13A. The last arm (13A) expands the gate G which thus closes the entrance 6 and the hen is imprisoned and forced to remain in the nest until an egg has been laid. The platform is locked in its lowered position by the primary egg receiving member under aperture 12, which member comprises mainly a forwardly opening scoop 17 fixed to the lower end of an L-shaped trigger lever 18, pivoted at 19 to a bracket 20 fixed to the under side of the platform, the lower arm of said trigger extending transversely and outwardly toward one edge of the platform and thence extended as a vertical arm 18V and close to side wall 5L. 18W is a counterweight outward of fulcrum 19 and normally causing arm 18V to bear outwardly and be engaged under a fixed block 21 on wall 5L when the platform is lowered (see full line showing of arm 18V in Fig. 4). In the latter described position of trigger 18 the receiving scoop 17 is normally parallel and close to the under side of the platform and directly under aperture 12. When an egg falls through the aperture 12 and onto scoop 17 the weight of the egg causes the scoop to bear down oscillating the trigger 18 which in turn is released from contact with block 21 at its upper end (see full line position of scoop and trigger in Fig. 4). The egg, however, remains in the scoop.

After laying the egg the hen will of course endeavor to get out of the nest and in stepping forward tilts the platform to original inclined position. This tilting action causes the gate G to be opened as pin 16 raises the lower arm of bell crank 14 which oscillates arm 13B, shaft 13 and arm 13A, the latter collapsing the gate G and leaving opening 6 clear. Simultaneously with the tipping of the platform to inclined position, the scoop member 17 is of course also tipped to a corresponding inclined position and the egg (designated 22) is rolled off of the scoop dropping onto the net or bottom 8B of the tray 8.

The operation of my device has been fully disclosed in the above description. It will now be readily understood, further, that any person may pull out the tray under the nest at any time to get the eggs therein whether or not the nest is occupied by a hen. The hen is not disturbed and on the other hand if a hen remains in a nest for any extended periods and does not lay an egg the attendant can thus readily determine which hens are not regular egg layers, such hens usually being segregated and thus weeded out for the benefit of the owner and improvement of the flock.

I have now fully disclosed the preferred construction of my device and its use. It will be readily understood that this type of nest may be built in single units or so-called sets or batteries of such units. The tops should of course be covered (not illustrated) by any suitable covering means where only a single unit, or row of units is in use, and of course where the units are set up in tiers the base of one unit may comprise the cover for the next lower unit. Various mechanical modifications of structure in smaller or larger parts of the device may be embodied without departing from the scope and spirit of the invention.

I claim:

1. A trap nest comprising a box-like housing provided with a passage opening in one end, a tray slidably mounted and insertible below said opening, an oscillatable platform within the housing, means for pivotally mounting said platform above said tray, an expanding and contracting type of gate mounted adjacent said opening, gate actuating means connecting the platform and gate to alternately expand and contract the gate member to close and open the passage when the rear end of the platform is oscillated downwardly and upwardly, respectively, said platform comprising a nest for a hen, said platform provided with an aperture for eggs to drop through, an egg catching and retaining device and means for pivotally mounting said device under said aperture, to retain an egg temporarily, and means operated by said egg catching device comprising in part a trigger, a fixed catch on the adjacent side wall of the housing and normally engaged by said trigger, said trigger adapted to be released by downward movement of the egg catching device caused by the weight of an egg dropped thereon, said release means permitting oscillation of the platform with a downward movement of its forward part and simultaneous opening of the gate.

2. A trap nest comprising a quadrangular housing with suitable integral base, a door opening provided in one end of said housing, an approximately horizontally disposed platform within the device, a transverse shaft pivotally supporting said platform approximately at its center, said platform comprising a nest floor and provided with an outlet near its innermost end, means limiting the oscillating movement of the platform, an egg-receiving scoop pivotally mounted to and under the platform and the scoop proper located directly under said opening, a slidable expanding gate mounted in proximity to said door opening, means operatively connected with the rear edge part of said platform and having operative connection with said gate and to operate to expand the gate to close the doorway when the rear part of the platform is lowered by the weight of a fowl thereon, and trigger means connected with said scoop normally retaining the platform in the said lowered position, said trigger means comprising an upright L-shaped lever, a fixed stop member in the side wall of the housing and engageable by the free upper end of said L-shaped lever, a scoop carried by the other arm of said lever, a pivot bracket fixed on the under side of the platform and said latter lever arm pivotally mounted thereon, said scoop tiltable downwardly under the weight of an egg and the tilting action of the scoop simultaneously releasing the integral upper arm of the lever.

3. The structure specified in claim 1, in which said gate actuating means comprises a bell crank at the rear wall, a pivot therefor to retain the bell crank in upright plane and near the rear edge of the platform, the horizontal arm of said bell crank slotted longitudinally near its free end, a peg in the rear edge of the platform slidably engaging in said slotted part of the horizontal arm, a rock shaft extending longitudinally of the nest and journaled in the front and rear walls thereof, a rear arm fixed on said rock shaft and the free end of it arranged to slidably engage the upright arm of the bell crank, said latter arm provided with a slot for said engagement, a forward rigid arm on said rock shaft, said gate formed with a rigid horizontal arm provided with an aperture for slidable engagement of said latter arm and to cause opening or closing of the gate consecutively according to the oscillating movement of the bell crank.

CARL S. HEDQUIST.